United States Patent [19]

Wissman

[11] Patent Number: 4,701,291
[45] Date of Patent: Oct. 20, 1987

[54] PROCESS OF ISOSTATIC MOLDING AND BONDING FLUOROPOLYMERS

[75] Inventor: Jack L. Wissman, Xenia, Ohio

[73] Assignee: The Duriron Company, Inc., Dayton, Ohio

[21] Appl. No.: 890,188

[22] Filed: Jul. 25, 1986

[51] Int. Cl.⁴ ............................................. B29C 65/02
[52] U.S. Cl. ................................ 264/248; 264/294; 264/296; 264/313; 264/318; 264/345; 264/348
[58] Field of Search ............... 264/127, 248, 162, 294, 264/296, 313, 345, 348, 318; 156/293, 294, 304.2, 304.6, 308.2, 311; 425/501, 508

[56] References Cited

U.S. PATENT DOCUMENTS

| | | | |
|---|---|---|---|
| 2,941,830 | 6/1960 | Burke et al. | 264/248 X |
| 3,470,289 | 9/1969 | Katsuki et al. | 264/313 X |
| 3,997,386 | 12/1976 | Oshida et al. | 264/248 X |
| 4,000,348 | 12/1976 | Harlow . | |
| 4,132,578 | 1/1979 | Gell, Jr. | 264/248 X |
| 4,211,594 | 7/1980 | Freitag et al. | 156/308.2 X |
| 4,283,448 | 8/1981 | Bowman | 264/248 X |
| 4,306,318 | 12/1981 | Mano et al. . | |
| 4,364,884 | 12/1982 | Traut | 264/248 X |
| 4,390,384 | 6/1983 | Turner | 264/248 X |
| 4,523,968 | 6/1985 | McCool | 156/294 X |
| 4,531,916 | 6/1985 | Scantlebury et al. . | |
| 4,539,113 | 9/1985 | Tomita et al. . | |
| 4,576,671 | 3/1986 | Shimanaka | 264/248 X |
| 4,585,060 | 4/1986 | Bernardin et al. . | |

FOREIGN PATENT DOCUMENTS

| | | | |
|---|---|---|---|
| 2549571 | 5/1977 | Fed. Rep. of Germany | 264/248 |
| 877148 | 9/1961 | United Kingdom | 264/249 |

OTHER PUBLICATIONS

Brochure "Hostaflon Information 21", American Hoechst Corporation, Plastics Division, 8/83.

Primary Examiner—Jeffery Thurlow
Assistant Examiner—Leo B. Tentoni
Attorney, Agent, or Firm—Biebel, French & Nauman

[57] ABSTRACT

PTFE is bonded directly to PTFE, and PTFE and related fluoropolymers are surface configured or molded, employing the differential expansion of the fluoropolymer to a confinement vessel or mold, and heating the same to fusion temperature and then cooling, creating a uniformly applied pressure on the polymer, followed by cooling while maintaining the pressure, at least during the initial cooling stages.

5 Claims, 7 Drawing Figures

PROCESS OF ISOSTATIC MOLDING AND BONDING FLUOROPOLYMERS

BACKGROUND OF THE INVENTION

This invention relates to methods of bonding and modifying polytetrafluoroethylene (PTFE) and related fluoro-polymers The well-known properties of PTFE make it particularly useful in environments where it is extremely important that the material itself is immune to contamination by reason of absorption and permeation and where the product will not react with other products, such as samples which are to be measured. Thus, PTFE has been considered to be essentially chemically inert in that practically all industrial chemicals and solvents, even at elevated temperatures and pressures, have little or no effect on it. This compatibility is the result of the strong inter-atomic bonds between the carbon-carbon and carbon-fluorine atoms, the almost perfect shielding of the carbon backbone by the fluorine atoms, and the high molecular weight. While nearly all plastics absorb small quantities of certain materials in which they come in contact, there is essentially no chemical interaction between PTFE and most other substances. The high molecular weight reduces the number of microscopic voids between the molecules which provide space for foreign substance to be lodged. PTFE resins absorb practically no common acids and bases at temperatures as high as 200° C. even over extended exposures.

The same qualities which make PTFE ideally suited as a vessel or a container or pumping apparatus for handling fluids or liquids, for which very precise measurements are required, make this product exceedingly difficult to bond to itself in the fabrication of assemblies manufactured exclusively of PTFE. As a result, it has become common practice to employ an intermediate bonding material such as FEP (fluoronated ethylene propylene) and PFA (copolymer of tetrafluoroethylene backbone and perfluoroalkoxy side chain). The practice of including an interface of non-PTFE material in joining together PTFE parts reduces the integrity of the assembly, to the extent that the bonding material has qualities which are less desirable than that of PTFE.

SUMMARY OF THE INVENTION

One aspect of this invention pertains to the bonding or welding of PTFE to itself, directly, and without the interposition of an intermediate material. This is accomplished by subjecting the parts or surfaces to be joined to an isostatic and/or directional pressure while raising the temperature of the joined parts to the fusion temperature and thereafter maintaining the pressure through the solidification phase. Weld factors of one can be achieved and dissimilarly shaped or formed parts of PTFE can be bonded along interfaces to provide an integral product of pure PTFE.

Preferably, the required pressure is achieved by supporting the parts to be bonded within a suitable mold or cavity formed, for example, of aluminum, and subjecting the parts and the supporting cavity to a high temperature bath of molten metal or salt at the desired temperature, and thereafter permitting the parts to cool within the mold. The mold is designed or constructed so that a desired pressure is created uniformly across the interface, where the bond is desired, by reason of the differential expansion of the PTFE to the containing material, at the fusion temperature. Typically, the fusion temperature will be from 620° to 640° F. for PTFE. Welds or bonds made according to this process exhibit diffused bond lines, and weld factors as high as unity.

A particular feature of the invention resides in its simplicity of application. Parts may be molded or bonded using only simple and easy to fabricate parts. In one aspect of the invention, a supporting container of aluminum is employed to surround and retain parts to be bonded during the heating and fusing phase, in the form of a cup, to retain an outer PTFE member and cause an inside member to be fused in the outer member. Such assembly may advantageously be heated to fusion temperature by immersion into a temperature controlled bath, such as molten salt, for a predetermined time. During the heating and fusing phase, the differential expansion of the PTFE to that of the metal cup causes the formation of a uniform pressure across the PTFE interfaces, or surfaces to be bonded. Upon the removal of the assembly from the bath, it may be water quenched to shorten the cooling time. The quenching step affects the material of the confining or containing mold more rapidly than the contained PTFE, due to the greater heat conductivity of the metal, and augments the pressure through the solidification phase.

In a further aspect of the invention, the different rates of thermal expansion, between metal and PTFE and related polymers, are advantageously employed to form or reform a plastic part, by confinement in a metal mold, followed by localized heating of the part in the mold, and the heating of the mold itself. Proper selection of dimensions between the formed part and a confining mold will assure that the polymer material is displaced when the temperature at fusion, or temperature at which the polymer becomes softened and flowable, is reached. This may also be accomplished by immersion of the parts in a molten bath for a time sufficient to assure reforming or reshaping to a surface of the mold. As mentioned, this process has been found to be of particular advantage for the formation of threads on the inside surface of a tubular polymer part, such as PTFE. For example, a threaded mold part may be inserted in such tubular part, a sleeve assembled about the part, the assembly heated as described and cooled, followed by the removal of the mold parts, to form internal or external threads, or other desired surface chacteristics.

The process of this invention may be employed to assemble PTFE parts which could not otherwise easily be made, by the making of two or more separate components, and by the bonding or welding of the components, while maintaining a uniform or an isostatic pressure across or between the components, in the manner described. In lieu of a confining mold, a suitable pressure medium may be used, such as an incompressible molten salt or metal at the desired temperature.

It is accordingly an object of this invention to provide a method of welding PTFE directly to PTFE.

Another object of the invention is the provision of welded or bonded PTFE parts which are free of non-PTFE material along the joining surfaces.

A further object of the invention is that of a process for the assembly of preformed PTFE parts or for the surface molding of such parts, employing the differential expansion of PTFE containment and metal or other materials to create a uniformly applied force on the PTFE part or parts.

Another object of the invention is that of a method for forming a surface configuration, such as threads, in a fluoropolymer part such as PTFE, PFA, ETFE, PCTFE or FEP, by the differential expansion of the polymer as compared to that of a confining mold.

A still further object of the invention is the provision of a method, as outlined above, for the joining together of two pure PTFE parts, useful in the manufacture of water monitoring or sampling equipment of high purity and integrity.

These and other objects and advantages of the invention will be apparent from the following description, the accompanying drawings and the appended claims.

DESCRIPTION OF PREFERRED EMBODIMENT

The methods of this invention each rely upon the substantial differences in thermal expansion between the polymer piece or pieces involved and the mold parts. For example, PTFE has a linear coefficient of expansion which may be expressed as follows:

$$5.4 \times 10^{-5} \text{ in/in/F.}°$$

Any metallic material can be dimensioned and employed to achieve the desired expansion pressure. A typical metal such as aluminum has a coefficient of thermal expansion which may be expressed as follows:

$$14.4 \times 10^{-6} \text{ in/in/F.}°$$

A comparison shows that PTFE and similar fluoropolymers undergo about a four fold degree of expansion greater than that of aluminum, and it is the force of differential expansion which is utilized by the methods of this invention to bond PTFE to itself, and to hot forge, reform or coin the surface characteristics of such a material, for example, to mold threads or the like into such a part. The high forces created may be utilized to fuse, forge, shape or displace the polymer, without the need for a hydraulic press or the like.

In employing the expansion characteristics of such materials, it is important to provide a uniform pressure to the piece or pieces undergoing welding or deformation, and the invention utilizes a controlled application of forces to achieve bonding, welding or material displacement to reconfigure the part in question.

Figure 3:
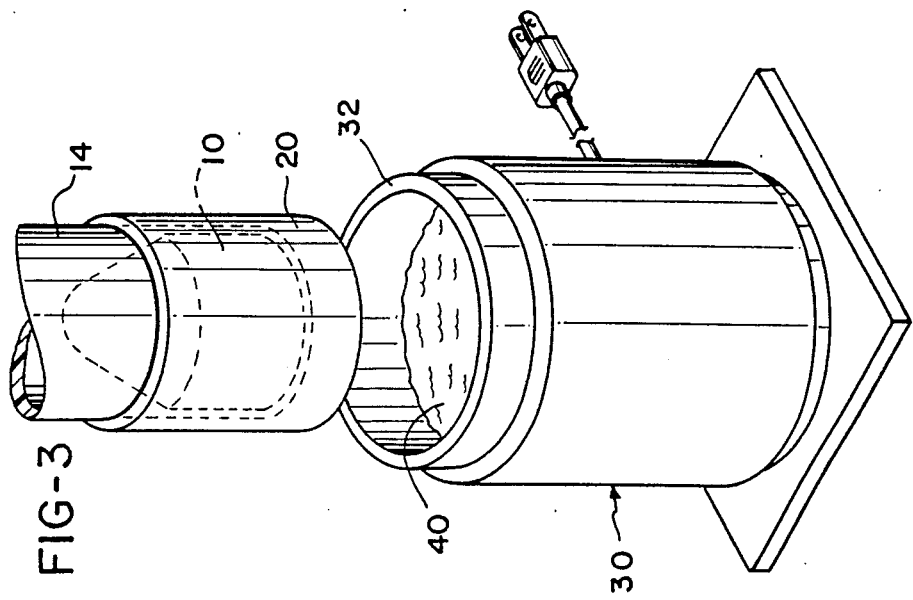
FIG. 3 illustrates the step of inserting the assembly of FIG. 2 into a high temperature liquid bath.
Figure 1:
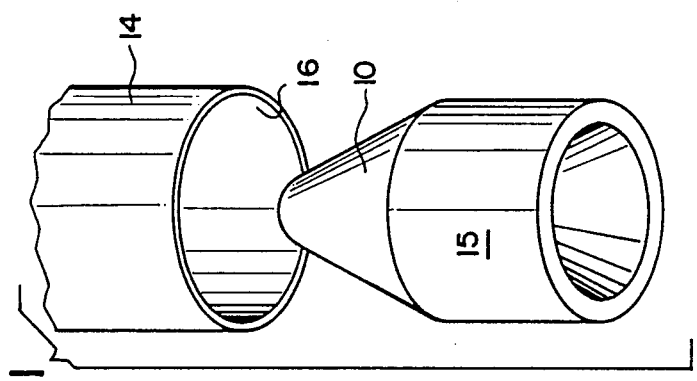
FIG. 1 is an exploded view of a pair of PTFE parts to be joined according to the method of this invention.
Figure 4:
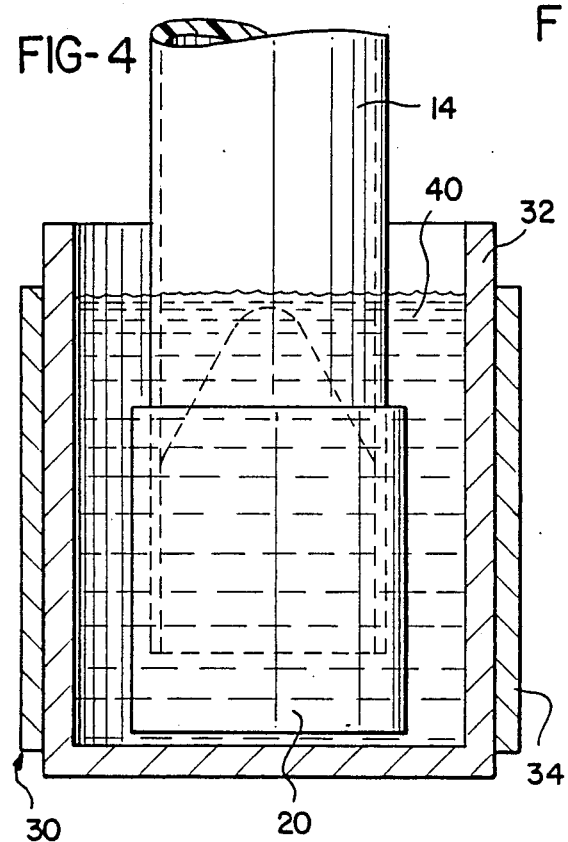
FIG. 4 is a sectional view through the bath of FIG. 3, showing the mold and assembly of parts therein.
Figure 5:
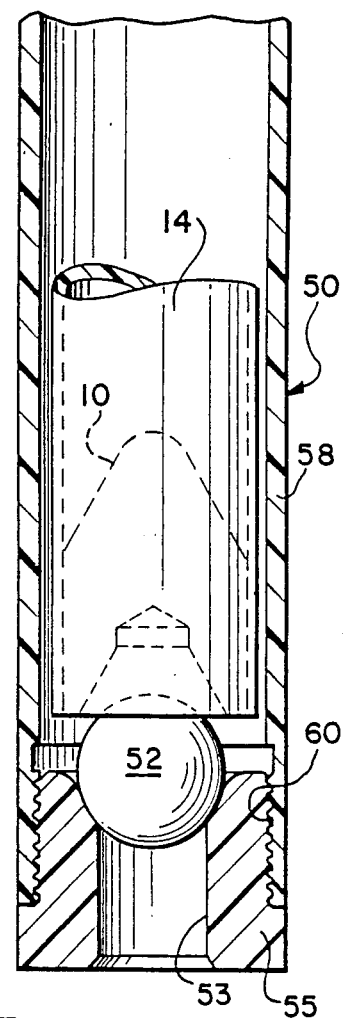
FIG. 5 is a sectional view of a portion of a high purity bladder pump made according to the method of this invention.

FIGS. 1-4 illustrate a representative example of the joining by welding of a PTFE end plug 10 to a PTFE sleeve or bladder 14, forming part of a high purity bladder pump, as partially shown in FIG. 5. The plug 10 has been formed by compression molding from PTFE powder, while the sleeve 14 has been formed by extrusion.

The outer cylindrical surface 15 of the plug is to be directly joined by welding or bonding to the adjacent inside surface 16 at the end of the sleeve. A weld factor approaching the strength of the material is desired.

Figure 2:
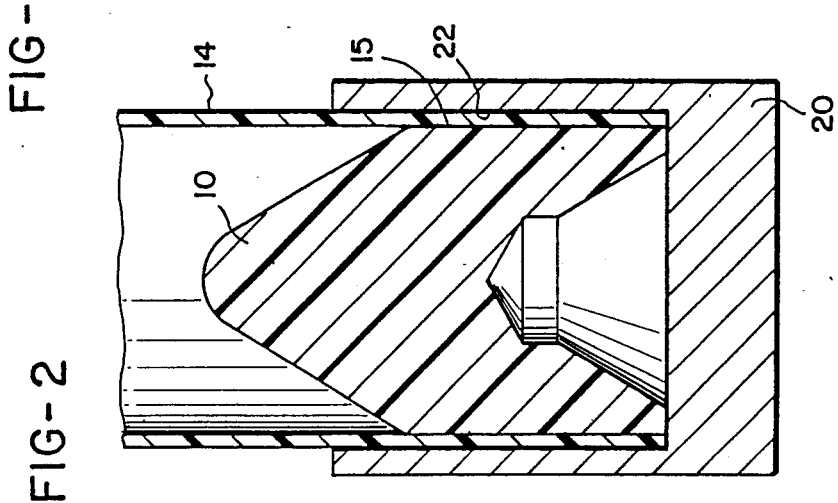
FIG. 2 shows the parts of FIG. 1 assembled for welding and received in a mold.

The assembled sleeve 14 and plug 10 are inserted into a conforming metal vessel in the form of a mold 20. As shown in FIG. 2, the mold 20 is cup-shaped with an inside surface 22 which conforms closely to the adjacent outer surface of the sleeve 14, and comprises the means by which a uniform directional pressure is applied to the abutting surfaces 15 and 16 to be welded. In the design of the mold, the size of the conforming opening is calculated, taking into account the cubic expansion of the PTFE, so as to provide a resulting pressure on the confined parts, which is less than that which causes permanent yield or undesired deformation or shear. A pressure of between 30 and 100 psi is believed to be adequate for good bonding. The mold 20 may be made of electroless nickel plated aluminum.

The next step in the process is to apply a uniform heat substantially at the fusion temperature of PTFE while simultaneously applying pressure, as described. This is achieved by immersing the assembled parts and mold into a molten bath of metal or salt. In the manufacture of a high purity bladder pump, sodium nitrate/nitrite salt is preferred over a lead alloy, to avoid any possibility of metal contamination.

A simple electrically heated lead pot 30 may be used, as shown in FIG. 3 containing "No. 330 Quench" salt of Park Chemical Co. of Detroit, Mich. 48204. The pot has a lined container 32, and a surrounding temperature-controlled heater band 34. The assembled parts are immersed as shown in FIG. 4 for a period of time sufficient to assure the achievement of fusion temperature at the interfaces between the parts to be welded For PTFE, the molten salt bath 40 should be held at a temperature of 620°–640F.°. Higher bath temperatures can be emplyed to minimize the time to reach fusion temperature to to achieve greater plastic displacement, and the parts as shown in FIG. 2 may be immersed 20–40 minutes.

When the parts are removed, the assembly is preferably water quenched, then allowed to cool in air. Quenching shortens the cooling time, and advantageously serves to maintain pressure across the weld during cooling by reason of the much higher rate of heat loss in quenching of the metal mold 20 over that of the polymer, which heat loss rate far exceeds the differential cubic retraction of the parts due to cooling.

The employment of the expansion of the PTFE with heat results in the effective bonding with the use of simple and low cost tooling. However, it is within the scope of the invention to employ other means for creating or forming a uniform pressure across the faces or surfaces to be joined, and in appropriate instances, a hydraulic force may be applied through the molten bath itself.

When the assembly has cooled, the mold or cup 20 will easily slide or fall off. The opposite end of the sleeve 14 may be similarly closed by welding, to form a completed bladder for a pump, a portion of which is shown at 50 in FIG. 5. As shown, the plug also forms a stop for a foot valve ball 52, which normally closes an inlet 53 in a bottom plug 55. The bottom plug is threaded into the end of an internally threaded cylindrical casing 58.

The invention also provides an effective and low-cost method for forming the inside threads, such as the threads 60 as shown in FIG. 5. In a broader sense, the method may be employed to form a configuration into or onto the surface of a PTFE or similar fluoropolymer part, utilizing the differential expansion of such polymer to a conforming mold when heated to or above its fusion temperature.

Figure 6:
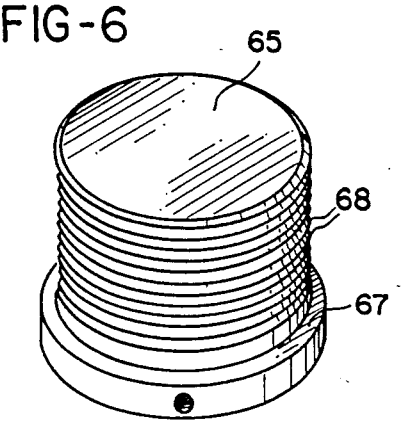
FIG. 6 is an isometric view of a mold part for use in forming a surface characteristic in a polymer piece according to this invention.
Figure 7:
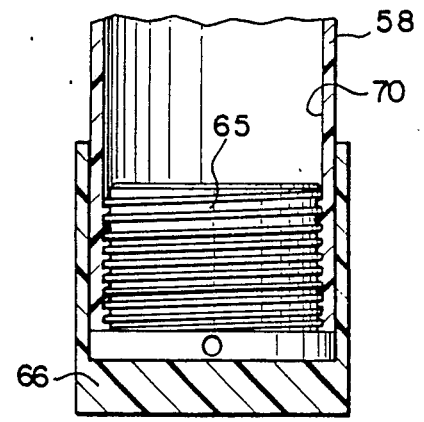
FIG. 7 illustrates the positioning of the end of a tubular piece to be reformed in a two part mold including the part of FIG. 6.

In the formation of inside threads, an inner mold member 65, FIG. 6, is positioned adjacent one wall or surface of the polymer, and an outer or second mold member 66 is positioned against another surface. The member 65 is shouldered at 67 to form a stop for the casing 58, and the threaded portion 68 forms a close fit with the adjacent inside surface 70 into which the inside threads 60 are to be formed. The assembly is, in turn, received with the closely conforming cylindrical wall 72 of the outer cup-shaped mold member 66 (FIG. 7), and the assembly is immersed in the molten salt in the pot 30 as previously described. In the case of the casing 58, the quantity of polymer to be heated is less than before, and a ten minute immersion followed by water quenching and cooling is sufficient to cause the material of the casing 58 to be permanently molded into the threads 68 of the inner mold member 65. The inner member may now be removed by unthreading.

In a broader sense, the invention comprises the steps of supporting a quantity of high density fluoropolymer, such as PTFE, between rigid mold members, at least one of which has formed thereon or therein a configuration different than that of the quantity or material, and selecting or designing the mold members so that the difference in volumes closely approximates the differential cubic expansion between the molds and the polymer at or abrove the TG or glass transition temperature of the polymer.

"Teflon" brand PTFE may be used for the parts to be welded, but improved bonds may be obtained by the use of a modified PTFE for one of the PTFE parts to be joined as sold by American Hoechst Corp., Route 202-206 North, Somerville, N.J. 08876 under the trade name "Hostaflon TFM" which has superior welding properties than conventional PTFE.

Displacement or expansion can be enhanced by employing an additional material in the mold, such as silicone rubber, to add volume differential to the expansion. While ceramic materials for the mold parts may be used, low cost aluminum is preferred.

In the practice of the methods of this invention, it is important to select the dimensions of the confining vessel or mold so that the polymer is not displaced beyond that desired, and in the bonding of PTFE, displacement as such is to be avoided. The polymer has low elastic strength at the fusion temperature, and if clearance or gap between the polymer and the containing vessel is insufficient, the polymer part may be subject to shear or deformation. Ideally, the pressure which the polymer can maintain at fusion without deformation represents all the force that can be applied to the part, and all the force that will be available to form a weld, unless it is possible to provide a containment arrangement which creates a true isostatic pressure on the part. The exact dimensions of the containment mold may require adjustment from the theoretical to obtain welding free of physical distortion of the parts being joined.

The considerations mentioned above with respect to the relative dimensions of the mold parts apply also to the containment mold in the applying of a surface characteristic to a polymer. However, in this case, a controlled distortion of the polymer part is desired, recognizing that only a limited pressure can be maintained by the part at fusion, While the process and product herein described constitute preferred embodiments of this invention, it is to be understood that the invention is not limited to this precise process and product, and that changes may be made therein without departing from the scope of the invention which is defined in the appended claims.

What is claimed is:

1. In the manufacture of a high purity bladder pump, the process of joining one end of a tubular bladder sleeve formed of PTFE with the outer surface of a cylindrical end plug formed of PTFE received in and closing an end of said sleeve, comprising the steps of:
   inserting said end plug within an end of said tubular sleeve for closing the end of said sleeve,
   inserting said plug and sleeve within a cup-shaped metallic mold which mold has an inside surface which conforms closely to the adjacent outer surface of the sleeve,
   heating by immersion of said mold in a molten bath to achieve fusion of said plug to said sleeve by reason of the differential cubic expansion of PTFE to said mold resulting in the formation of pressure on said plug and sleeve within said mold,
   removing said mold from said bath and quenching said mold with water to cause more rapid cooling of said mold than the plug and sleeve components therein, thereby maintaining said pressure thereon during at least a portion of the quench.

2. The process of claim 1 in which said bath is a salt bath at a temperature of between 620° and 640° F., and said pressure is between 30 and 100 psi.

3. The method of forming threads on an inside surface of a tubular sleeve of PTFE material comprising the steps of:
   inserting a first metal mold member into the interior of said sleeve at one end thereof, said first mold member closely conforming to the inside surface of said sleeve and having threads formed on an outer surface thereof,
   inserting said sleeve and said first mold member into a cup-shaped second metal mold member closely conforming to the adjacent outside surface of said sleeve, with the difference in volume between said mold members and the portion of said sleeve inserted therebetween closely approximating the difference in cubic expansions of said inserted portion of said sleeve and said mold members at an elevated temperature approaching the fusion temperature of said PTFE material,
   heating said mold members with said sleeve therebetween in a molten salt bath to approximately said fusion temperature to cause the permanent displacement of said sleeve between said mold members into said threads of said first mold member,
   cooling said mold members while maintaining said pressure on said PTFE material therebetween during at least an initial portion of said cooling,
   and thereafter removing said second mold member and unthreading said first mold member from said sleeve to define permanent inside threads on said one end of said sleeve.

4. The method of reconfiguring a quantity of high density high molecular weight polymer material such as PTFE, comprising the steps of:

supporting the quantity in a space between rigid metal mold members at least one of which has formed thereon a configuration different than that of said quantity, with the difference in volume between said mold members and said quantity closely approximating the difference in cubic expansion of said quantity and said members at an elevated temperature approaching or exceeding the melt temperature of said polymer, heating said quantity and said mold members together to cause said quantity to expand to said differential configuration, and cooling said quantity and said members together to maintain pressure between said quantity and members during at least an initial portion of said cooling.

5. The method of claim 4 in which said quantity is a sleeve, and in which said mold members respectively surround said sleeve about inside and outside diameters thereof, and in which said difference in configuration is defined by threads formed in at least one of said mold members.

* * * * *